May 15, 1934. G. ALBANESE ET AL 1,958,983
HOT OR COLD BED INCLOSURE
Filed March 16, 1934
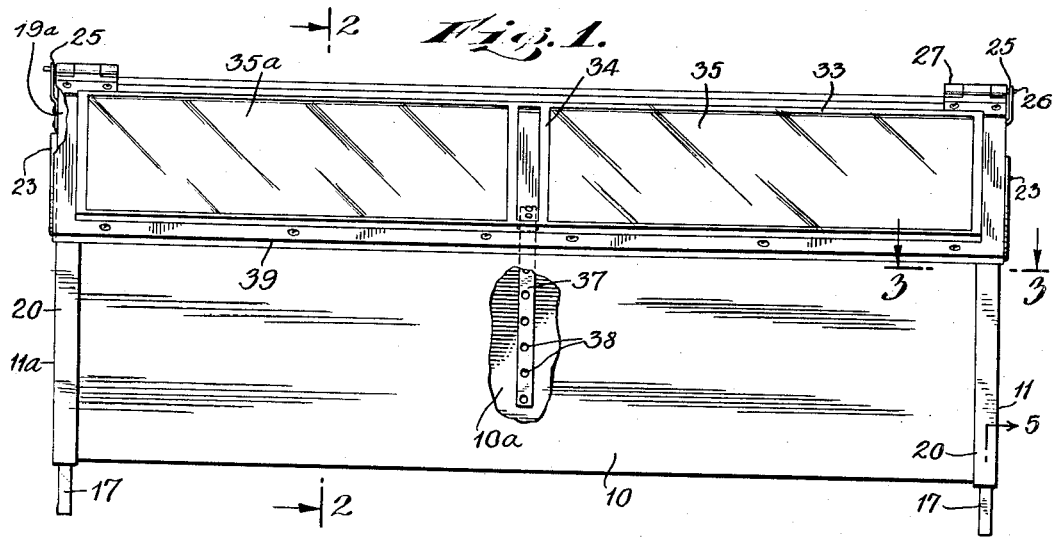
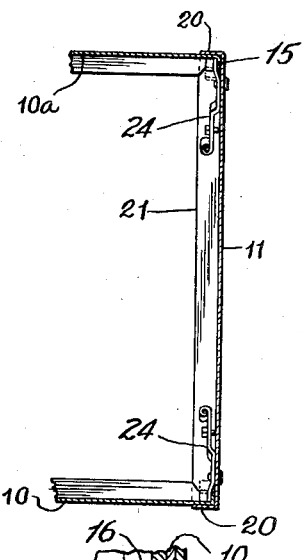
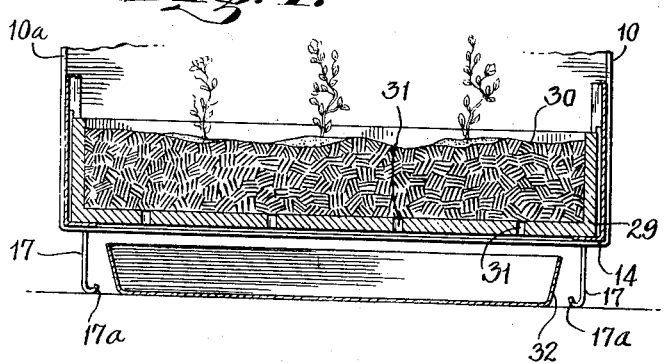
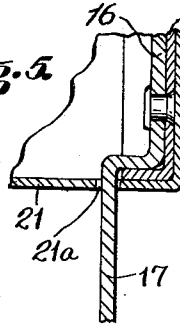
INVENTORS
Gaetano Albanese
Howard C. Thompson Patented May 15, 1934

1,958,983

UNITED STATES PATENT OFFICE 1,958,983

HOT OR COLD BED INCLOSURE

Gaetano Albanese, New York, N. Y., and Howard E. Thompson, Westfield, N. J.; said Thompson assignor to said Albanese Application March 16, 1934, Serial No. 715,909

12 Claims. (Cl. 47—19)

This invention relates to the raising of small plants of various kinds and classes and particularly to the provision of an inclosure or frame to provide protection for what are commonly known as hot or cold beds to facilitate the growth of small plants to provide an early start for a flower or vegetable garden; and the object of the invention is to provide a device of the class described which is composed of detachably coupled parts so as to facilitate the compact packing thereof for shipment and transportation as well as for storage when not in use; a further object being to provide means for coupling the several parts of the inclosure or frame without the necessity of using tools of any kind or class; a further object being to provide an inclosure which consists primarily of three different parts, one part being duplicated to form front and back walls, another part duplicated to form end walls and the third part duplicated to form hingedly coupled top walls, thus materially simplifying the manufacture of the complete device and permitting the placement of the device upon the market at a relatively low selling price; a still further object being to provide an inclosure of the class described which will form relatively tight joints at the intersections of the parts so as to protect the interior of the inclosure against water conditions in the manner of a hot house; a still further object being to provide an inclosure of the class described which may be utilized in conjunction with a flat or tray for raising small plants indoors or in a conservatory or porch inclosure; and with these and other objects in view, the invention consists in a device of the class and for the purpose specified, which is simple in construction, efficient in use, and which is constructed as hereinafter described and claimed.

The invention is fully disclosed in the following specification of which the accompanying drawing forms a part, in which the separate parts of our invention may be designated by suitable reference characters in each of the views and in which:

Fig. 1 is a side view of the device with parts of the construction broken away.

Fig. 2 is a section on the line 2—2 of Fig. 1, with one part shown in a raised position.

Fig. 3 is a partial section on the line 3—3 of Fig. 1.

Fig. 4 is a view similar to Fig. 2 indicating a different use of the device; and, Fig. 5 is a partial section on the line 5—5 of Fig. 1 on an enlarged scale.

For the purpose of illustrating one method of carrying our invention into effect, we have indicated in the accompanying drawing an inclosure for forming what is commonly known as a cold frame or hot bed or which may also be termed a miniature hot house. In the construction shown, the device is constructed from three pairs of similar parts, namely, the parts 10, 10a, which for the purpose of this description may be termed side walls or front and back walls; parts 11, 11a which may be termed end walls; and parts 12, 12a which may be termed top walls or the part 12 may be termed the front top wall and the part 12a the rear top wall.

In that the parts 10, 10a are of substantially similar construction, the brief description of one will apply to the other in the separate pairs of parts. The part 10 consists of an elongated panel which in the construction shown is preferably composed of metal. This panel has upper and lower inwardly directed flanges 13 and 14 and inwardly directed end flanges 15. At the ends and lower corner portions of the part 10 adjacent the end flanges 15 are secured coupling members 16, the lower ends of which are offset inwardly and protrude below the part 10 to form supporting feet or pegs 17. Centrally of the top flange 13 is secured an inwardly directed pin or bolt 18.

Each of the end wall parts consists in the construction shown of a sheet of metal, the lower portion of which is rectangular in form and the upper portion, or in other words that part thereof which projects above the upper edges of the parts 10, 10a when coupled with the end walls, is V-shaped in form or has upwardly inclined edges 19 having inwardly bent flanges 19a which are continuous with flanges 20 at the sides of the part 11 as well as with flanges 21 at the bottom thereof.

In the construction shown, a transparent panel or window 22 is secured in the upper V-shaped portion of the parts 11, 11a and held in place by strips 23 in order to give added light to the ends of the inclosure. However, these panels are not absolutely essential. Pivotally secured to the inner surfaces of the parts 11, 11a are coupling levers 24 for finger portions 24a and jaw portions 24b, the latter being brought into engagement with the end flanges 15 of the parts 10, 10a in coupling the parts 10, 10a with the end walls 11, 11a as clearly seen in Fig. 2 of the drawing. In detaching the parts, the levers 24 are moved into the dotted line position indicated at the left of Fig. 2. The levers 24 serve to draw the parts 10, 10a into firm engagement with the parts 11, 11a to form substantially air-tight joints between said parts, it being noted in Fig. 3 that the ends of the parts 10 and 10a fit within the flanges 20 of the parts 11, 11a.

In coupling the wall parts together, the members 16 are passed downwardly through apertures 21a in the bottom flange 21 as clearly indicated in Fig. 5 to couple the lower corner portions of the end walls 11 with the corresponding corner portions of the walls 10, 10a. Secured to the upper peaked ends of the walls 11, 11a are upwardly directed and projecting brackets 25 apertured to receive the pins or pintles 26 of hinges 27 employed for hingedly coupling the parts 12 and 12a together, and in coupling the parts 12, 12a with the inclosure formed by the coupled parts 10, 10a, 11, 11a, the brackets 25 are sprung outwardly a sufficient degree to permit the coupling of the pins 26 therewith.

It will be understood at this time that when the parts 10, 10a, 11, 11a are coupled together, a large opening is formed in the bottom thereof and the resulting inclosure may be mounted in connection with the ground indicated at 28 in Fig. 2 of the drawing by simply passing the supporting feet or pegs 17 into the ground. However, in early planting, it would be found practical to imbed the lower portion of the walls 10, 10a, 11, 11a in the ground to bring the level of the ground to a position such as indicated at 28a in dotted lines in Fig. 2. This has further advantages in that it brings the soil within the inclosure to a more desirable level. It will also be apparent that the soil outwardly of the inclosure may be banked if desired.

It will also be understood that the inclosure may be used indoors or in a conservatory or porch inclosure, in which event, a flat or tray 29, containing suitably prepared soil 30, may be made to fit snugly within the inclosure and to rest upon the flanges 14 as indicated in Fig. 4 of the drawing. In this use, it is practical to provide small drainage openings 31 in the bottom of the flat so that excessive moisture that may prevail in the soil 30 in watering can drop into a suitable drip pan 32 disposed beneath the inclosure as indicated in Fig. 4. In this inclosure, we also preferably provide the lower ends of the pegs 17 with turned supporting feet 17a which will avoid marring a support upon which the device is arranged.

Each part 12, 12a is in the form of a rectangular frame having an offset portion 33 joined centrally by a similar portion 34 forming two large openings for receiving transparent panels 35, 35a, detachably secured in place by strips 36 arranged on the inner surface of the parts 12, 12a. Pivoted centrally to each part 12, 12a is a latch bar or rod 37 having a series of apertures 38 adapted to engage the pins 18 to support the parts 12, 12a in raised position to ventilate the inclosure whenever desired. With this construction, it will be apparent that the inclosure may be ventilated from the front or back side portion thereof or from both in extremely warm weather. The degree of ventilation may be governed by the height at which the parts 12, 12a are raised. Normally, these parts rest snugly upon the upper edges of the parts 10, 10a, 11, 11a and it is preferred that the parts 12, 12a have downwardly turned flanges 39.

When the parts are detached for shipment or storage, they will assume a package no greater in length than the length of the longest of said parts, no wider than the widest of the parts and of a thickness equal to that of the parts disposed one upon the other. Another advantage of the invention lies in the fact that the complete assemblage, by virtue of the construction herein disclosed, will be relatively light in weight and can be shipped and transported at a nominal expense in a convenient package.

Furthermore, it will be apparent that by reason of the fact that only three different parts are employed in the complete device, the manufacturing cost may be materially reduced, thus permitting the placement of the article on the market at a low retail price, and a device of the class described will find its usefulness to suburban home owners in raising flower seeds for their gardens, by starting them out of doors in a cold frame or hot bed or indoors in a similar sense, or as a miniature hot house.

It will also be apparent that the device may be used as a means for protecting sensitive plants in the home during cold weather conditions, it being understood that the complete device may be made attractive in appearance by lithographing, painting or otherwise characterizing the complete device. It will be understood that while we have shown certain details of construction for carrying our invention into effect and have illustrated certain uses of the invention, we are not necessarily limited in this respect, and various changes in and modifications of the construction herein shown and described may be made within the scope of the appended claims without departing from the spirit of our invention or sacrificing its advantages.

Having fully described our invention, what we claim as new and desire to secure by Letters Patent, is:

1. A cold bed inclosure device of the class described, comprising quickly attachable and detachable parts consisting of front and back wall parts of similar size and construction, each part being fashioned from a sheet of material, end wall parts of similar size and construction fashioned from sheet material and coupled with the front and back wall parts, the front, back and end wall parts being of sufficient height to embed the lower ends thereof in the ground leaving a deep chamber within said walls above the ground, a top wall hingedly coupled with the top of the inclosure, and said top wall including transparent panels.

2. A cold bed inclosure device of the class described, comprising quickly attachable and detachable parts consisting of front and back wall parts of similar size and construction, each part being fashioned from a sheet of material, end wall parts of similar size and construction fashioned from sheet material and coupled with the front and back wall parts, the front, back and end wall parts being of sufficient height to embed the lower ends thereof in the ground leaving a deep chamber within said walls above the ground, a top wall hingedly coupled with the top of the inclosure, said top wall including transparent panels, the upper ends of the end wall parts projecting above the front and back wall parts, and said projecting upper ends of the end wall parts including transparent panels.

3. A device of the class described comprising quickly attachable and detachable parts consisting of front and back wall parts of similar size and construction, each part being fashioned from a sheet of material, end wall parts of similar size and construction fashioned from sheet material and coupled with the front and back wall parts, the end wall parts having upwardly projecting portions terminating in hinged pin bearings, a top wall consisting of similar hingedly connected members having transparent panels, and the hinge of said members having pins detachably coupled with the bearings of said end wall parts.

4. A device of the class described comprising quickly attachable and detachable parts consisting of front and back wall parts of similar size and construction, each part being fashioned from a sheet of material, end wall parts of similar size and construction fashioned from sheet material and coupled with the front and back wall parts, the end wall parts having upwardly projecting portions terminating in hinged pin bearings, a top wall consisting of similar hingedly connected members having transparent panels, the hinge of said members having pins detachably coupled with the bearings of said end wall parts, and each of said top wall members being freely movable on the hinge and having means for adjustably supporting the same in raised position to ventilate said inclosure.

5. A knockdown inclosure of the class described consisting of two pairs of wall parts composed of sheet material, one pair forming the front and back walls of the inclosure and the other pair forming the end walls thereof, said walls being coupled together to form a rectangular inclosure open at the top and bottom, and interengaging means on the intersecting corner portions of said pairs of walls for detachably coupling and securing all of said walls together to rigidly support the inclosure in set-up condition, said last named means including levers pivotally supported on said end walls, and cooperating with the front and back walls.

6. A knockdown inclosure of the class described consisting of two pairs of wall parts composed of sheet material, one pair forming the front and back walls of the inclosure and the other pair forming the end walls thereof, said walls being coupled together to form a rectangular inclosure open at the top and bottom, and interengaging means on the intersecting corner portions of said pairs of walls for detachably coupling and securing all of said walls together to rigidly support the inclosure in set-up condition, said last named means comprising members on the front and back walls keyed to the end walls and projecting below the lower edges of all of said walls to form anchor or supporting legs, and levers pivotally supported on said end walls and cooperating with the front and back walls.

7. A knockdown inclosure of the class described consisting of two pairs of wall parts composed of sheet material, one pair forming the front and back walls of the inclosure and the other pair forming the end walls thereof, said walls being coupled together to form a rectangular inclosure open at the top and bottom, interengaging means on the intersecting corner portions of said pairs of walls for detachably coupling and securing all of said walls together to rigidly support the inclosure in set-up condition, a top wall consisting of similar hingedly connected members having transparent panels, and the hinge of said members having pins detachably coupled with the end walls in mounting the top wall on the inclosure.

8. A knockdown cold bed inclosure or the like, comprising an elongated body consisting of similar front and back wall parts, each composed of a single sheet of metal, similar sheet metal end wall parts detachably coupled with the front and back wall parts to form said inclosure, top wall parts hingedly coupled together and detachably and pivotally supported in connection with the end wall parts, said top wall parts including sheet metal frames with transparent panels disposed in said frames, and means at the intersecting corners of the front, back and end walls and constituting unit parts thereof for quickly coupling and clamping said walls together in forming said inclosure.

9. A knockdown cold bed inclosure or the like, comprising an elongated body consisting of similar front and back wall parts, each composed of a single sheet of metal, similar sheet metal end wall parts detachably coupled with the front and back wall parts to form said inclosure, top wall parts hingedly coupled together and detachably and pivotally supported in connection with the end wall parts, said top wall parts including sheet metal frames with transparent panels disposed in said frames, means at the intersecting corners of the front, back and end walls and constituting unit parts thereof for quickly coupling and clamping said walls together in forming said inclosure, said last named means including members secured to one wall and engaging the other adjacent wall and projecting beyond the lower edges of said walls to form supporting legs.

10. A knockdown hot house comprising an elongated inclosure consisting of similar front and back wall parts, each composed of a sheet of metal having inwardly turned peripheral flanges, similar sheet metal end wall parts having inwardly projecting peripheral flanges, said end wall parts being detachably coupled with the first named wall parts with the flanges of the end wall parts overlying said front and back wall parts, the end wall parts including upwardly directed V-shaped extensions disposed above the upper edges of the front and back wall parts and terminating at their ends in bearings, a top wall consisting of separate members hingedly coupled together, and the hinge of said members being detachably coupled with said bearings, and the members of said top wall resting on said front, back and side walls in downwardly inclined relation at opposed sides of the inclosure.

11. A knockdown hot house comprising an elongated inclosure consisting of similar front and back wall parts, each composed of a sheet of metal having inwardly turned peripheral flanges, similar sheet metal end wall parts having inwardly projecting peripheral flanges, said end wall parts being detachably coupled with the first named wall parts with the flanges of the end wall parts overlying said front and back wall parts, the end wall parts including upwardly directed V-shaped extensions disposed above the upper edges of the front and back wall parts and terminating at their ends in bearings, a top wall consisting of separate members hingedly coupled together, the hinge of said members being detachably coupled with said bearings, interengaging means at the lower corner portions of the inclosure for coupling the end walls with the front and back walls, and levers pivotally mounted in connection with the end walls and adapted to engage the flanges of the front and back walls adjacent the upper corners thereof to couple said walls together.

12. A knockdown hot house comprising an elongated inclosure consisting of similar front and back wall parts, each composed of a sheet of metal having inwardly turned peripheral flanges, similar sheet metal end wall parts having inwardly projecting peripheral flanges, said end wall parts being detachably coupled with the first named wall parts with the flanges of the end wall parts overlying said front and back wall parts, the end wall parts including upwardly directed V-shaped extensions disposed above the upper edges of the front and back wall parts and terminating at their ends in bearings, a top wall consisting of separate members hingedly coupled together, the hinge of said members being detachably coupled with said bearings, interengaging means at the lower corner portions of the inclosure for coupling the end walls with the front and back walls, levers pivotally mounted in connection with the end walls and adapted to engage the flanges of the front and back walls adjacent the upper corners thereof to couple said walls together, and means on the front and back walls and movably supported in connection with the separate members of the top wall for adjustably supporting each of said members in raised position.

GAETANO ALBANESE.
HOWARD E. THOMPSON.